UNITED STATES PATENT OFFICE.

RENÉ BOHN, OF MANNHEIM, GERMANY, ASSIGNOR TO THE BADISCHE ANILIN AND SODA FABRIK, OF LUDWIGSHAFEN, GERMANY.

BLACK DYE AND PROCESS OF MAKING SAME.

SPECIFICATION forming part of Letters Patent No. 631,613, dated August 22, 1899.

Application filed December 27, 1897. Serial No. 663,720. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of New Black Coloring-Matters Derived from Naphthazarin, of which the following is a specification.

I have discovered that a new series of black coloring-matters can be produced by treating naphthazarin with an aromatic amin with or without the use of a so-called "condensing" agent. The products so obtained are black coloring-matters of great importance, which yield on chrome-mordanted animal and vegetable fiber a more bluish lake than naphthazarin itself. These products are only slightly soluble in water, but they can be very easily converted into soluble compounds either by means of concentrated or fuming sulfuric acid, thus forming sulfoacids which are soluble in water and dye chrome-mordanted wool a black shade, or by treatment with sulfites or bisulfites of the alkalies. The water-soluble coloring-matters are of great importance, their chrome-lakes being very fast. The reaction can be effected in the presence of a suitable diluent, such as water, alcohol, glacial acetic acid, or the like. The presence of a so-called "condensing" agent, such as boracic acid, causes the reaction to proceed with greater rapidity. The products prepared in the presence of such a so-called "condensing" agent dissolve in caustic soda with a violet-blue color, while the products obtained without such an agent dissolve in alkali first with a greenish-blue color. Both compounds, however, on sulfonating yield sulfoacids which cannot be distinguished from one another.

The following examples will serve to illustrate the manner in which my invention can best be carried into practical effect. The parts are by weight.

Example 1: Treat about one thousand (1,000) parts of a twenty per cent. (20%) naphthazarin paste while stirring with a solution of about two hundred (200) parts of anilin in about six hundred (600) parts of glacial acetic acid. Add about two hundred (200) parts of boracic acid to the mass and keep the temperature at about forty degrees centigrade (40° C.) for twelve hours. The reaction is finished when a test portion taken shows no more naphthazarin which can be recognized, when the test dissolves in caustic soda with a reddish-violet color instead of the cornflower-blue characteristic of naphthazarin. Pour into water, filter, and wash until neutral. The new dyestuff can directly be employed in the form of a paste for dyeing and printing.

Example 2: Stir about one hundred (100) parts of dry naphthazarin at the ordinary temperature with about one hundred (100) parts of anilin and treat the mass after twenty-four hours with about one hundred (100) parts of hydrochloric acid and about five hundred (500) parts of water. Filter, wash, and dry. The product so obtained is a black metallic powder which is insoluble in water. In caustic soda it dissolves with a greenish-blue color, which is gradually converted into a pure blue on exposure to the air. The dyestuff so obtained can directly be used in the form of a paste for dyeing and printing.

Example 3: Heat about one hundred (100) parts of the compound produced according to Example 1 or Example 2 on the water-bath with about five hundred (500) parts of monohydrate sulfuric acid ($H_2SO_4$) for about five hours. The greatest part of it is converted into a sulfoacid easily soluble in water. Pour the whole into about two thousand (2,000) parts of water. Boil, filter, salt the solution out with common salt, filter, press, and dry. The coloring-matter so obtained is a reddish-brown powder, which very easily dissolves in water with a red color and in caustic soda with a violet-blue color.

Instead of anilin other aromatic amins can be used with a similar effect. Such are, for instance, ortho-toluidin, para-toluidin, alpha and beta naphthylamin.

The reaction products of naphthazarin with the various aromatic amins are very similar to one another in their reactions. In the following I give a table of some reactions of the above-referred-to reaction products obtained according to Example 1:

|  | Color. | Solution in caustic soda. | Solution in sulfuric acid. |
|---|---|---|---|
| Anilin | Bluish-black powder. | Violet | Violet. |
| Ortho-toluidin | Brown powder. | Bluish violet | Reddish violet. |
| Para-toluidin | Brown powder. | Reddish violet. | Reddish violet. |
| Alpha-naphthyl-amin. | Bluish-black powder. | Bluish green | Violet. |
| Beta-naphthyl-amin. | Bluish-black powder. | Blue | Violet. |

Example 4: Treat about eight hundred (800) parts of the reaction product of naphthazarin and anilin in the form of a twenty-per-cent. (20%) paste with about two hundred (200) parts of sodium bisulfite containing about forty per cent. (40%) of sodium bisulfite ($NaHSO_3$) and heat at a temperature of about ninety-five degrees centigrade (95° C.) for two hours. The paste so obtained dissolves in water with a brown color and can directly be used for printing. The dry coloring-matter is a brown powder soluble in water. The solution with caustic soda has a green color, which is converted into blue on exposure to the air or more rapidly when boiled. In cold concentrated sulfuric acid it dissolves with a dirty-brown color, which solution on heating becomes beautiful violet. The soluble-bisulfite compounds of the reaction products of naphthazarin with the other aromatic amins differ only slightly from one another.

I hereinafter use the term "sulfonated form" to include the soluble products obtained by treating the reaction products of naphthazarin and an aromatic amin either with ordinary or fuming sulfuric acid or with the bisulfites or sulfites of the alkalies, as hereinbefore described.

Now what I claim is—

1. The process for the manufacture of new black coloring-matters by treating naphthazarin and an aromatic amin with the addition of hereinbefore-described so-called condensing agent and with the use of a liquid diluent, all substantially as hereinbefore described.

2. The process for the manufacture of new black coloring-matters by reacting with naphthazarin upon an aromatic amin substantially as hereinbefore described.

3. As a new article of manufacture the coloring-matter which can be obtained by treating naphthazarin with an aromatic amin, and which in the unsulfonated form, as a paste, produces directly on chrome-mordanted animal and vegetable fiber a more bluish lake than does the naphthazarin itself, and gives a reddish-violet to bluish-green color with caustic-soda solution; in the sulfonated form, as hereinbefore defined, it dyes chrome-mordanted wool a black shade, substantially as described.

4. As a new article of manufacture the new black coloring-matter which can be obtained by treating the reaction product of naphthazarin and anilin with sodium bisulfite and which occurs as paste and powder of a brownish color soluble in water, with cold concentrated sulfuric acid it gives a dirty-brown color which on heating becomes violet all substantially as hereinbefore described.

In testimony whereof I have hereunto set my hand in the presence of two subscribing witnesses.

RENÉ BOHN.

Witnesses:
GUSTAV L. LICHTENBERGER,
BERNHARD C. HESSE.